US008089244B2

(12) United States Patent
Zhang et al.

(10) Patent No.: US 8,089,244 B2
(45) Date of Patent: Jan. 3, 2012

(54) ELECTRONIC DEVICE

(75) Inventors: Wei-Ming Zhang, Shenzhen (CN); Jun Lu, Shenzhen (CN); Jin Li, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 370 days.

(21) Appl. No.: 12/481,689

(22) Filed: Jun. 10, 2009

(65) Prior Publication Data

US 2010/0148722 A1 Jun. 17, 2010

(30) Foreign Application Priority Data

Dec. 15, 2008 (CN) .......................... 2008 1 0306260

(51) Int. Cl.
*H02J 7/00* (2006.01)
*H02J 7/02* (2006.01)
*H01R 13/44* (2006.01)

(52) U.S. Cl. ......... 320/107; 320/111; 320/114; 439/131

(58) Field of Classification Search .................. 320/107, 320/111, 114; 439/131
See application file for complete search history.

(56) References Cited

U.S. PATENT DOCUMENTS

| | | | | |
|---|---|---|---|---|
| 3,519,914 | A * | 7/1970 | Fujimaki et al. | 320/111 |
| 3,930,309 | A * | 1/1976 | Collins | 30/161 |
| 4,086,523 | A * | 4/1978 | Izumi | 320/111 |
| 5,220,152 | A * | 6/1993 | Doran | 219/201 |
| 5,494,449 | A * | 2/1996 | Chioo | 439/76.1 |
| 5,635,814 | A * | 6/1997 | Afzal et al. | 320/111 |
| 6,494,727 | B2 * | 12/2002 | Wen-Ching | 439/131 |
| 7,197,965 | B1 * | 4/2007 | Anderson | 81/73 |
| 2002/0119687 | A1 * | 8/2002 | Wen-Ching | 439/131 |
| 2006/0089026 | A1 * | 4/2006 | Song | 439/131 |
| 2009/0061666 | A1 * | 3/2009 | Yu | 439/131 |

* cited by examiner

*Primary Examiner* — M'Baye Diao
(74) *Attorney, Agent, or Firm* — Altis Law Group, Inc.

(57) ABSTRACT

An electronic device includes a main body, at least two pins folded mounted to the main body, and at least two conductive assemblies received in the main body. Each of the conductive assemblies includes a locking member and a resilient member resisting the locking member, when the pins are pushed and substantially perpendicular to main body, each locking member is capable of locking with an end of one of the pins.

6 Claims, 6 Drawing Sheets

ELECTRONIC DEVICE

BACKGROUND

1. Technical Field

The present disclosure generally relates to electronic devices, particularly, to an electronic device with a charging assembly.

2. Description of Related Art

Various of electronic devices, such as mobile phones, PDAs (personal digital assistants), MP4 players, are popular because of the convenience or entertainment they provide. A user must often take along a charger or ensure that the electronic device has sufficient power.

A typical electronic device includes a main body, a pair of pins rotatably and foldably mounted to the main body, two engaging nuts, and two electrode plates with different polarities. The main body has a casing in which the engaging nuts and electrode plates are received. When the pins are rotated to be substantially perpendicular to an outer surface of the casing, an end of each of the pins can be pressed to engage one engaging nut and connected with one of the electrode plates. In this state, the electronic device is capable of being charged. When the electronic device is fully charged, the user needs to pull the pins to disengage the ends of the pins from the engaging nuts. Then the pins can be folded over the outer surface of the casing.

However, the user needs to push the pins to engage with the engaging nuts when the electronic device needs to be charged, and pull the pins to disengage from the engaging nuts when the electronic device is fully charged, thus the electronic device is inconvenient for use.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
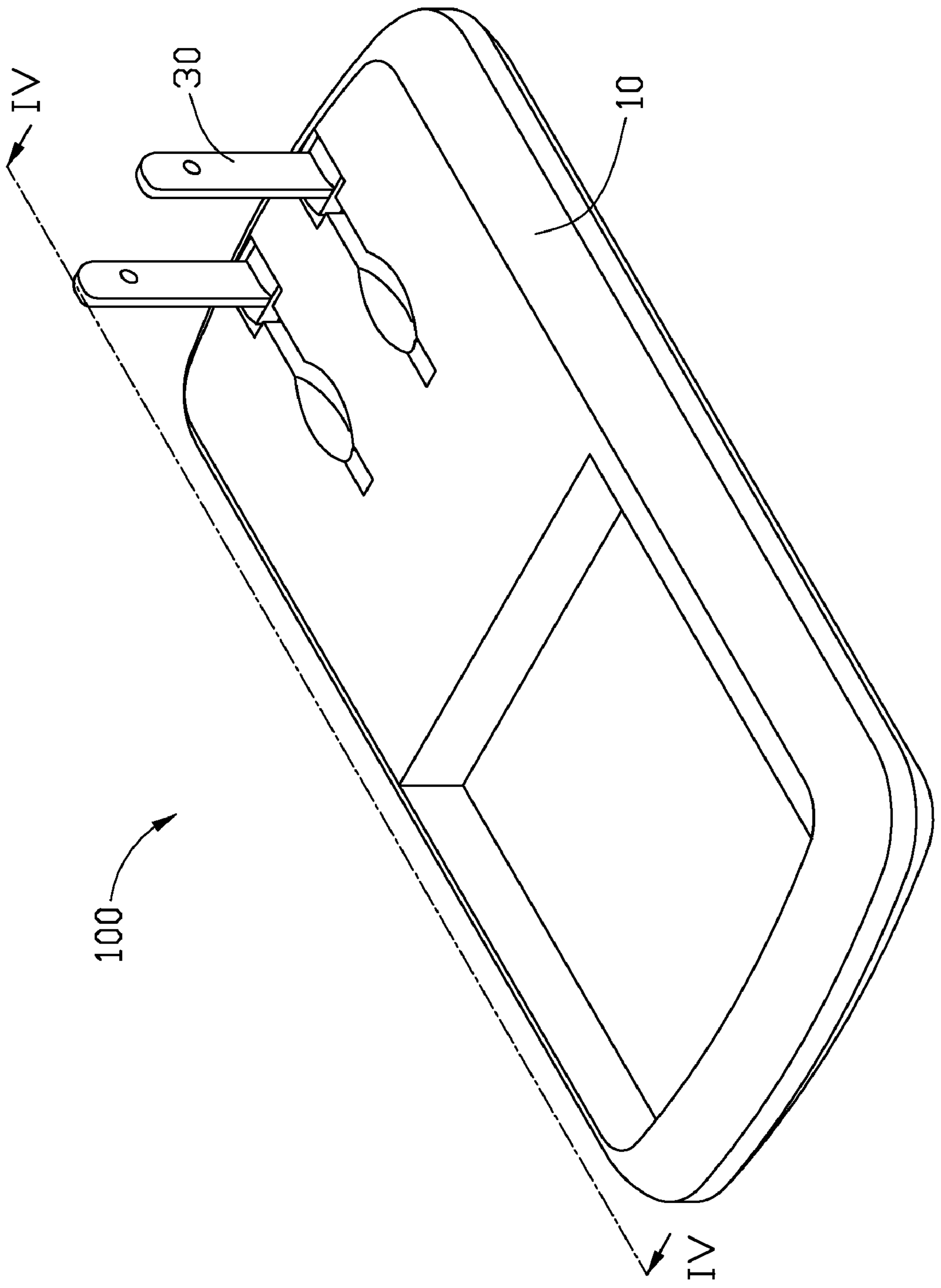
FIG. 1 is an assembled, isometric view of one embodiment of an electronic device showing a plurality of pins being in a charging position.
Figure 2:
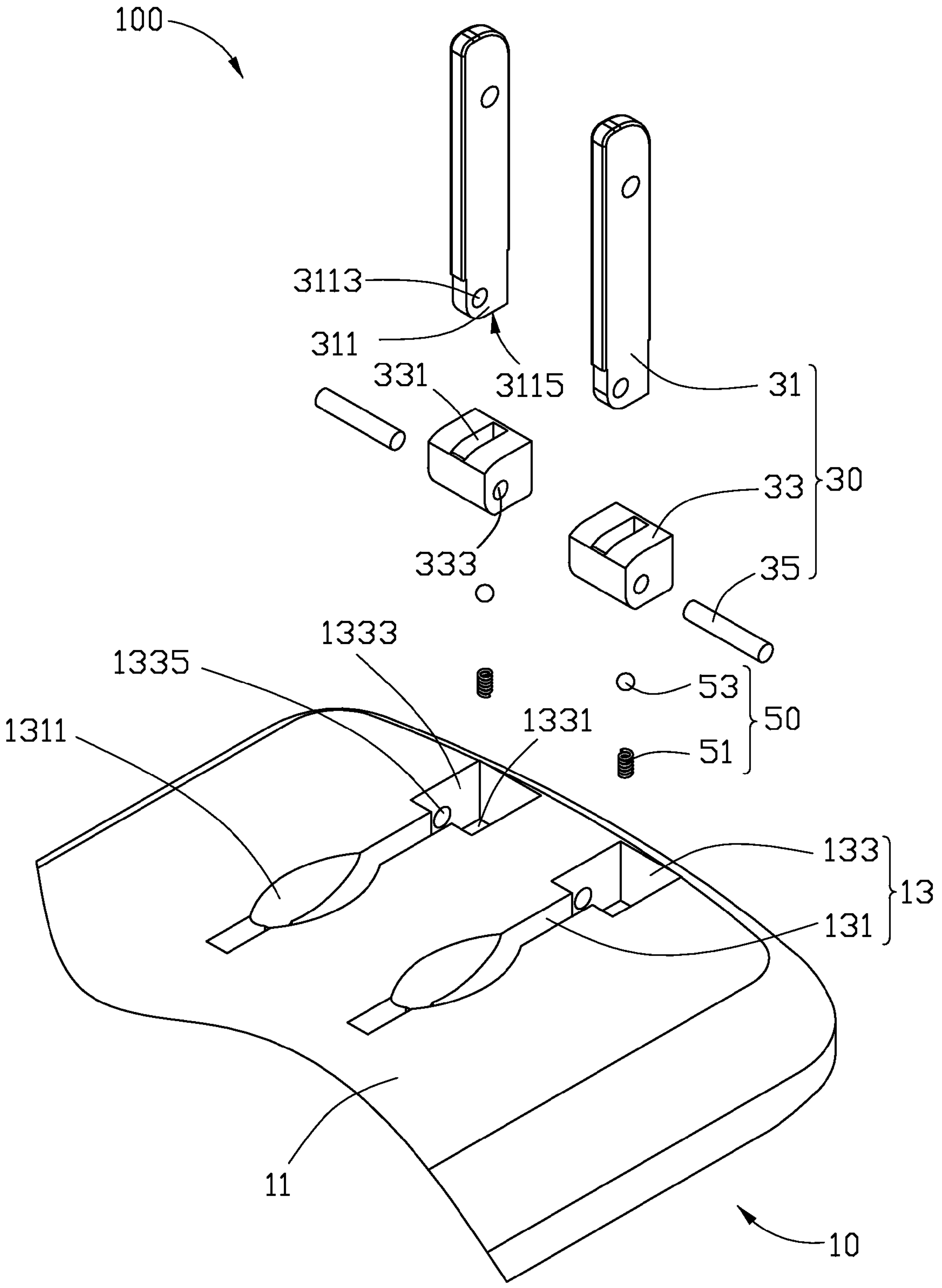
FIG. 2 is a partially exploded, isometric view of the electronic device of FIG. 1.

The present electronic device may be a mobile phone, a PDA and so on. In the illustrated exemplary embodiment, the electronic device is a mobile phone. Referring to FIG. 1 and FIG. 2, an embodiment of a mobile phone 100 includes a main body 10, a pair of pins 30 mounted to the main body 10, and a pair of conductive assemblies 50 received in the main body 10. The pins 30 are rotatable relative to the main body 10 so as to be folded over or unfolded from the main body 10.

Figure 3:
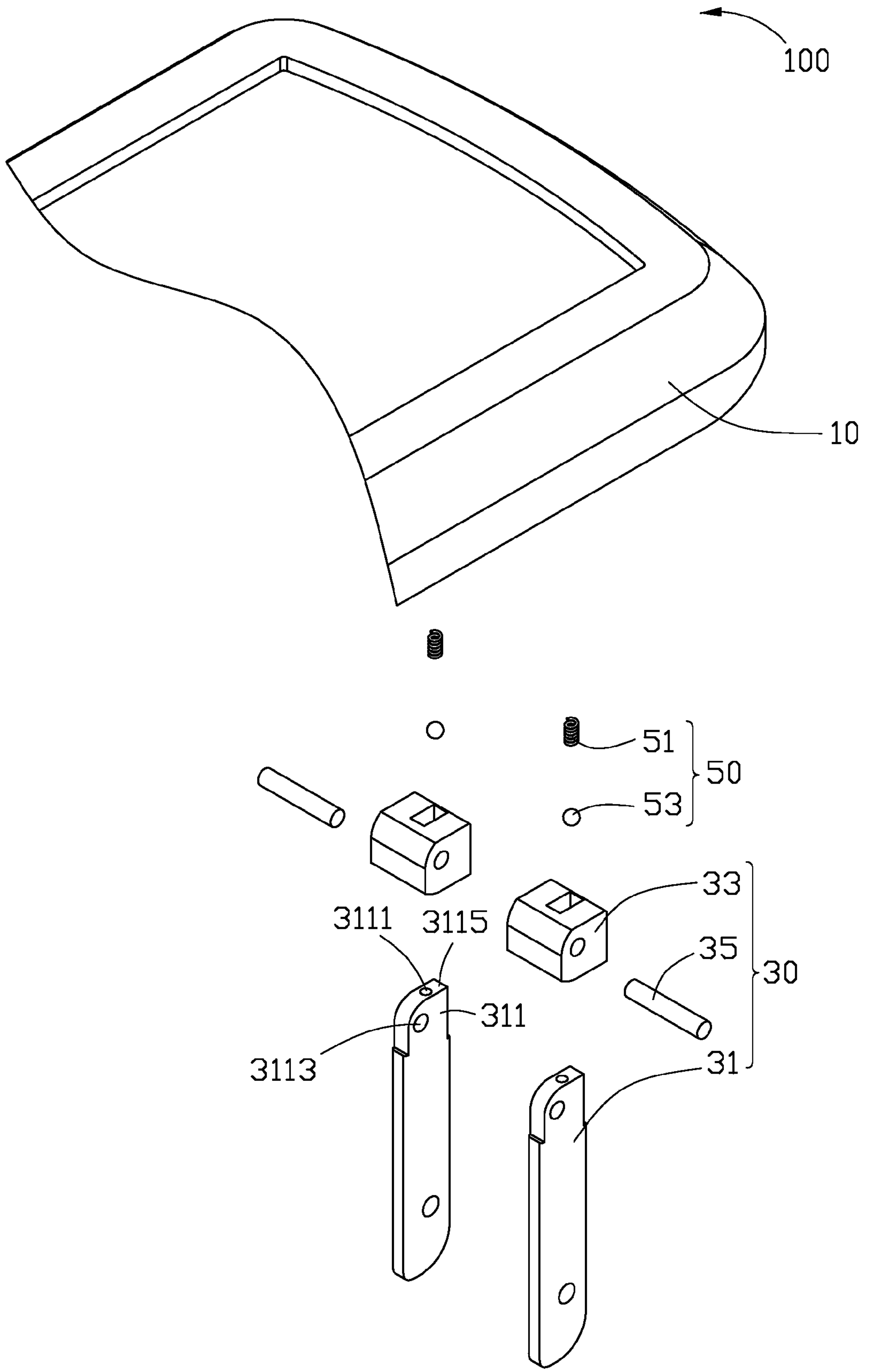
FIG. 3 is similar to FIG. 2, but viewed from another aspect.
Figure 4:
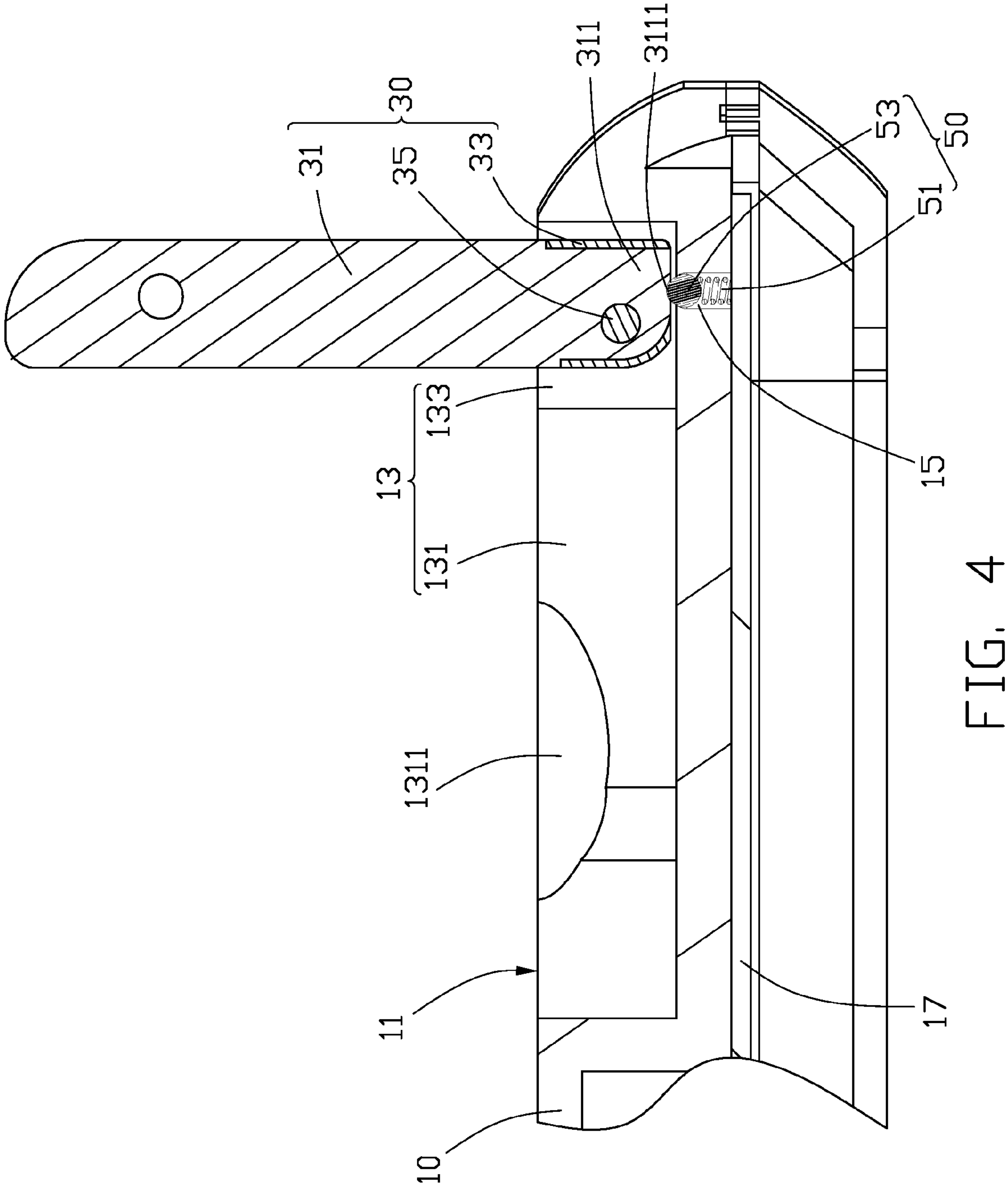
FIG. 4 is a part of a cross-sectional view of FIG. 1, taken along line IV-IV

Referring to FIG. 2 to FIG. 4, the main body 10 has a surface 11 and defines two first receiving grooves 13 and two second receiving grooves 15. The first receiving grooves 13 are depressed from the surface 11 and communicate with two second receiving grooves 15 correspondingly. The second receiving grooves 15 communicate with inside of the main body 10. The main body 10 includes a circuit board 17 received therein. Each second receiving groove 15 is between one of the first receiving grooves 13 and the circuit board 17.

Each of the first receiving grooves 13 is defined by a first slot 131 and a second slot 133 communicating with each other. The main body 10 further defines two depressions 1311 at opposite sides of each first slot 131, therefore, fingers of a user can extend into the depressions 1311 to pull an end of each pin 30 out of the first slot 131. The second slot 133 is bonded by cooperation of a bottom wall 1331 and four sidewalls 1333 perpendicular to the bottom wall 1331. Two of the sidewalls 1333 opposite to each other each define an engaging hole 1335.

Each of the second receiving grooves 15 is defined in one corresponding bottom wall 1333 and communicates with the inside of the main body 10. In the illustrated embodiment, the diameter of each of the second receiving grooves decreases from the end adjacent to the first receiving grooves 13 to the end away from the first receiving grooves 13, therefore, the conductive assemblies 50 can be securely received in the second receiving grooves 15.

Each of the pins 30 includes a conductive electrode 31, an insulating member 33, and a pivot shaft 35 running through the conductive electrode 31 and the insulating member 33.

The conductive electrode 31 has an end 311 received in the second slot 133, and defines a notch 3111 and a pivot hole 3113. The notch 3111 is defined at the end 311 of the conductive electrode 31, an inside surface of the notch 3111 curved. The pivot hole 3113 is adjacent to the end 311.

The insulating member 33 defines a through slot 331 and a through hole 333. The end 311 of the conductive electrode 31 is partially received in the through slot 331, and part of an end surface 3115 of the end 311 is exposed out of the insulating member 33. Two sides of the insulating member 33 resist the two of the sidewalls 1333 defining the engaging holes 1335.

The pivot shaft 35 runs through the pivot hole 3113 of the conductive electrode 31, the through hole 333 in the insulating member 33, and the engaging holes 1335 of the sidewalls 1333, such that the conductive electrode 31 and the insulating member 33 are rotatably connected on the main body 10. The insulating member 33 is made of insulating materials. In the illustrated embodiment, the insulating member 33 is made of plastic.

Each of the conductive assemblies 50 includes a resilient member 51 and a locking member 53. An end of the resilient member 51 resists the locking member 53, and the other end of the resilient member 51 resists the circuit board 17 in the main body 10. A surface of the locking member 53 is curved. The conductive assemblies 50 are correspondingly received in the second receiving grooves 15, and capable of contacting with the pins 30. In the illustrated embodiment, the resilient member 51 is a compression spring. The locking member 53 is a metallic ball. The diameter of the locking member 53 is larger than the diameter of each of the second receiving grooves 15 adjacent to the second slot 133, and smaller than the diameter of the resilient member 51, therefore, the conductive assemblies 50 are securely received in the second receiving grooves 15.

Figure 5:
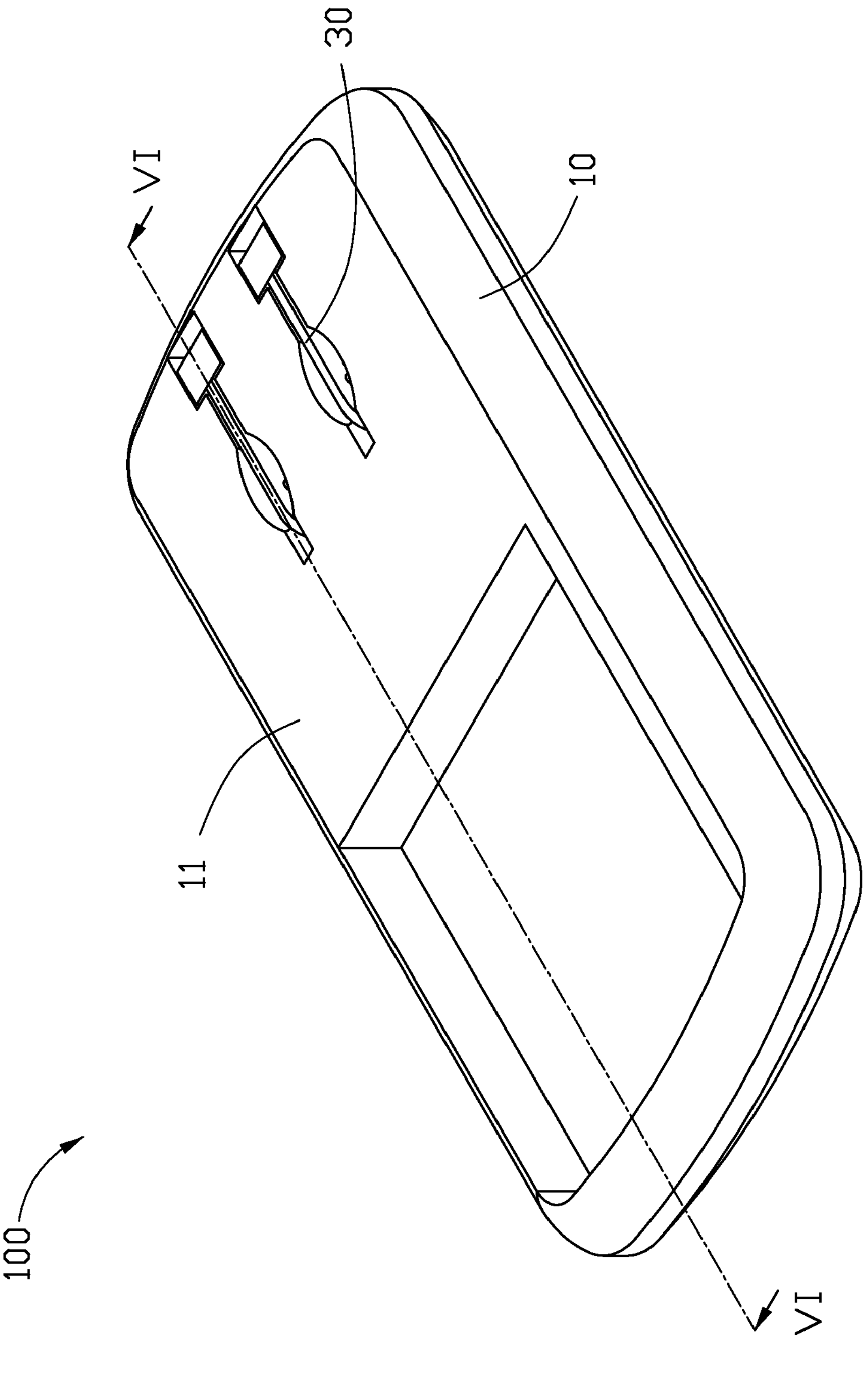
FIG. 5 is similar to FIG. 1, but showing the pins in another position.
Figure 6:
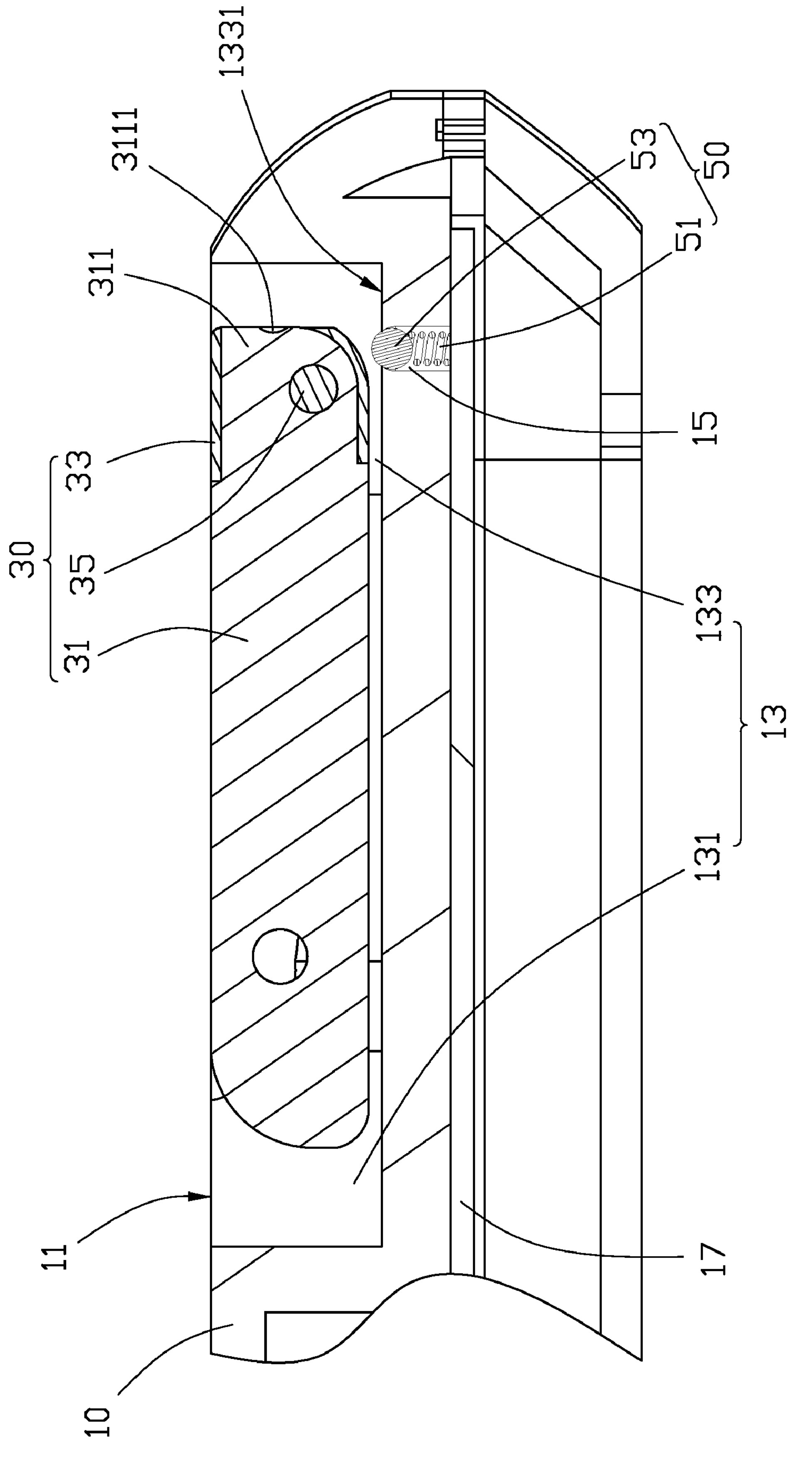
FIG. 6 is a part of a cross-sectional view of FIG. 5, taken along line VI-VI.

Referring to FIG. 5 and FIG. 6, when the mobile phone 100 is not being charged, the pins 30 are folded over the main body 10 and wholly received in the first receiving groove 13. The insulating member 33 partially enveloping the end 311 of each pin 31 insulates the conductive assembly 50 from the pins 31, therefore, the electric power of the mobile phone 100 will not leak. In this state, the resilient member 51 is compressed.

Referring to FIG. 2 to FIG. 4, in use, fingers of the user extend into the two depressions 1311 and pull the end of the conductive electrode 31 away from the end 311 out of the first slot 131. The conductive electrode 31 is substantially perpendicular to the surface 11 of the main body 10. The end 311 of the conductive electrode 31 rotates around the pivot shaft 35, and the end surface 3115 of the end 311 faces the bottom wall 1331 of the second slot 133. In this state, the locking member 53 is partially locked into the notch 3111 and resists the conductive electrode 31 pushed by the resilient member 51. The conductive electrode 31 communicates with the circuit board 17 in the main body 10. A locking force is generated between the conductive electrode 31 and the locking member 53 pushed by the resilient member 51.

When the electronic device is fully charged, the user pushes the conductive electrode 31 with a force greater than the locking force between the conductive electrode 31 and the locking member 53, and the conductive electrode 31 is rotated and wholly received in the first receiving groove 13 again.

When the mobile phone 100 needs to be charged, the locking member 53 is partially engage with the notch 3111 and locked with the conductive electrode 31 by the resistance of the resilient member 51, therefore, the conductive electrode 31 can be securely positioned in the charging state. In addition, since the surface of the locking member 53 and the surface in the notch 3111 are curved, when the conductive electrode 31 is pushed by a large enough force, the locking member 53 can slide out of the notch 3111 and be unlocked from the locking member 53. Furthermore, the insulating member 33 resists two of the sidewalls 1331 of the second slot 133, thereby, minimizing or preventing vibration of the end 311 of the conductive electrode 31 and the insulating member 33 received in the second slot 133.

In alternative embodiments, the number of the pins 30 may be three. Correspondingly, the number of the conductive assemblies 50 may also be three. The second slot 133 may be defined by cooperation of the bottom wall 1331 and a continuous curved sidewall. The resilient member 51 may be a resilient piece. One of the surfaces of the notch 3111 and the surface of the locking member may not be curved, but instead, for example, the notch 3111 or the locking member 53 may be reversed V-shaped.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An electronic device comprising:

a main body defining two first receiving grooves and two second receiving grooves, each first receiving groove including a first slot and a second slot communicating with each other, each second receiving groove positioned under the second slot and communicating with the second slot;

two pins rotatably mounted to the first receiving grooves of the main body;

two conductive assemblies, each of the two conductive assemblies comprising a resilient conducting member and a locking conducting member together received in the second receiving grooves, one end of the locking member abutting against one end of the pins, the other end of the locking member abutting against one end of the resilient member; and a circuit board received in the main body, the other end of the resilient member abutting against the circuit board;

wherein when the electronic device is charged, each locking member is pushed by one of the resilient members and locked in position by an end of one of the pins to electrically connect the pins to the circuit board; wherein when the electronic device is not charged, the two pins are folded and received in the two first receiving grooves to far away from the locking members.

2. The electronic device of claim 1, wherein an end of each pin adjacent to one of the locking members defines a notch, and the locking members is locked in position by the notches.

3. The electronic device of claim 1, wherein a surface of the locking member and an inside surface of the notch are curved.

4. The electronic device of claim 1, wherein each second slot is bounded by a bottom wall and at least a sidewall, each second receiving groove in the bottom wall of the second slot.

5. The electronic device of claim 4, wherein the resilient member is a compression spring, and the locking member is a metallic ball.

6. The electronic device of claim 1, wherein each pin comprises a conductive electrode, a pivot shaft and an insulating member partially receiving an end of the conductive electrode, and the conductive electrodes are mounted to the insulating members with the two pivot shafts, the pivot shafts are rotatable connecting the conductive electrodes and the insulating members in the first receiving grooves.

* * * * *